US012458880B2

(12) United States Patent
Yamana et al.

(10) Patent No.: US 12,458,880 B2
(45) Date of Patent: Nov. 4, 2025

(54) GAME SYSTEM, GAME METHOD, GAME PROGRAM, AND GAME SERVER FOR A PUZZLE GAME

(71) Applicant: The Pokemon Company, Tokyo (JP)

(72) Inventors: Manabu Yamana, Tokyo (JP); Masayuki Kawamoto, Tokyo (JP)

(73) Assignee: THE POKÉMON COMPANY, Tokyo (JP)

( * ) Notice: Subject to any disclaimer, the term of this patent is extended or adjusted under 35 U.S.C. 154(b) by 309 days.

(21) Appl. No.: 17/975,794

(22) Filed: Oct. 28, 2022

(65) Prior Publication Data

US 2023/0053101 A1 Feb. 16, 2023

Related U.S. Application Data

(63) Continuation of application No. PCT/JP2021/000038, filed on Jan. 4, 2021.

(30) Foreign Application Priority Data

May 1, 2020 (JP) ................................ 2020-080967

(51) Int. Cl.
*A63F 13/35* (2014.01)
*A63F 13/44* (2014.01)
(Continued)

(52) U.S. Cl.
CPC .............. *A63F 13/44* (2014.09); *A63F 13/35* (2014.09); *A63F 13/69* (2014.09); *A63F 13/822* (2014.09);
(Continued)

(58) Field of Classification Search
CPC .......... A63F 13/35; A63F 13/44; A63F 13/69; A63F 13/822; A63F 2300/807; A63F 2300/609; A63F 2300/638; A63F 2300/53
See application file for complete search history.

(56) References Cited

U.S. PATENT DOCUMENTS 6,386,980 B1 * 5/2002 Nishino .................. A63F 13/35 463/43
2010/0234083 A1 * 9/2010 Hagiwara ............... A63F 13/80 463/43
(Continued)

FOREIGN PATENT DOCUMENTS

JP 2016-202839 A 12/2016
JP 2016-209532 A 12/2016
(Continued)

OTHER PUBLICATIONS

Translation of Written Opinion of the International Searching Authority mailed on Mar. 23, 2021, in corresponding PCT Application PCT/JP2021/000038, 4 pages.
(Continued)

*Primary Examiner* — Omkar A Deodhar
(74) *Attorney, Agent, or Firm* — XSENSUS LLP

(57) ABSTRACT

A puzzle game that enhances a degree of freedom of movement of a puzzle element includes selecting a first puzzle element; moving the first puzzle element; generating a coupled puzzle element when a puzzle element with a same appearance comes into contact with the first puzzle element; causing, when a second puzzle element of a different type comes into contact with the first puzzle element or the coupled puzzle element, the second puzzle element to execute a predetermined operation; and when at least a condition in that an operation of a player with respect to the first puzzle element is no longer performed or a condition in that a predetermined time has elapsed from a time point at which the selection of the first puzzle element is satisfied, erasing the first puzzle element or the coupled puzzle element from the game area.

18 Claims, 8 Drawing Sheets

(51) Int. Cl.
*A63F 13/69* (2014.01)
*A63F 13/822* (2014.01)

(52) U.S. Cl.
CPC ..... *A63F 2300/53* (2013.01); *A63F 2300/609* (2013.01); *A63F 2300/638* (2013.01); *A63F 2300/807* (2013.01)

(56) References Cited

U.S. PATENT DOCUMENTS

| | | | | |
|---|---|---|---|---|
| 2015/0224403 | A1* | 8/2015 | Hisaoka ................ | A63F 13/537 463/29 |
| 2016/0214014 | A1* | 7/2016 | Shiota ..................... | A63F 13/80 |
| 2017/0340976 | A1* | 11/2017 | Kim ........................ | A63F 13/79 |
| 2018/0280805 | A9* | 10/2018 | Hisaoka .................. | A63F 13/20 |

FOREIGN PATENT DOCUMENTS

| | | | |
|---|---|---|---|
| JP | 2017-80313 | A | 5/2017 |
| JP | 2019-72558 | A | 5/2019 |

OTHER PUBLICATIONS

International Search Report and Written Opinion mailed on Mar. 23, 2021, received for PCT Application PCT/JP2021/000038, Filed on Jan. 4, 2021, 11 pages including English Translation.

* cited by examiner

GAME SYSTEM, GAME METHOD, GAME PROGRAM, AND GAME SERVER FOR A PUZZLE GAME

CROSS-REFERENCE TO RELATED APPLICATIONS

This application is a Bypass Continuation of International Application No. PCT/JP2021/000038, filed Jan. 4, 2021, which claims priority to JP 2020-080967, filed May 1, 2020, the entire contents of each are incorporated herein by its reference.

BACKGROUND

Technical Field

The present disclosure relates to a game system, a game method, a game program, and a game server. In particular, the present disclosure relates to a game system, a game method, a game program, and a game server using a puzzle element.

Description of the Related Art

Conventionally, there is a known program that causes a computer to execute the steps of: controlling display of a plurality of types of puzzle elements on a display screen; changing a type of one puzzle element specified based on an operation of a player to a type being the same as a type of a puzzle element at any position adjacent to a position of the one puzzle element; and erasing, when a predetermined number or more of puzzle elements of a same type are arranged adjacent to each other, the puzzle elements arranged adjacent to each other (for example, refer to PTL 1). According to the program described in PTL 1, strategic characteristics of a game can be enhanced while making an operational performance that is required of a player easier.

CITATION LIST

Patent Literature

[PTL 1] Japanese Patent Application Publication No. 2016-202839

SUMMARY

Technical Problems

However, in conventional games using a puzzle element, a movement of the puzzle element in a game area displayed on a display unit of an information terminal or the like is limited. In addition, such games require that a plurality of puzzle elements dropping downward from an upper part of the game area be operated while contemplating an appropriate combination of the puzzle elements or that, as in the case of the program described in PTL 1, one of a plurality of puzzle elements be operated while constantly contemplating whether or not it is preferable to change a type of the one puzzle element to a same type as a puzzle element at any of positions adjacent to the one puzzle element in consideration of combinations, arrangements, and the like of the plurality of puzzle elements. Therefore, in conventional games using puzzle elements including the program described in PTL 1, although strategic characteristics of a game can be enhanced, there may be cases where the game cannot be advanced at a good pace due to psychological pressure of having to appropriately arrange the puzzle elements despite a degree of freedom of movement of the puzzle elements being low.

Solutions to Problems

In consideration thereof, an object of the present disclosure is to provide a game system, a game method, a game program, and a game server which improve a degree of freedom of movement of a puzzle element and which enable a game to be executed at a good pace, the good pace corresponding to a predetermined pace that would be expected compared to conventional games.

In order to achieve the object described above, the present disclosure provides a game system capable of executing a game using a puzzle element in a game area, the game system including: an element selecting portion which selects a first puzzle element from one or more puzzle elements of one or more types in accordance with an operation of a player; a movement control portion which moves the first puzzle element selected by the element selecting portion inside the game area in accordance with an operation of the player; a coupling portion which, when a puzzle element with a same appearance as the first puzzle element selected by the element selecting portion comes into contact with the first puzzle element, couples the first puzzle element and the puzzle element with the same appearance as the first puzzle element to each other and generates a coupled puzzle element having the first puzzle element and the puzzle element with the same appearance as the first puzzle element as components; an operation control portion which, when a second puzzle element of a type that differs from the first puzzle element comes into contact with the first puzzle element or the coupled puzzle element, causes the second puzzle element to execute a predetermined operation without coupling the first puzzle element and the second puzzle element to each other; and an erasure control portion which, when at least any one of a condition in that an operation of the player with respect to the first puzzle element selected by the element selecting portion is no longer performed and a condition in that a predetermined time has elapsed from a time point at which the element selecting portion had selected the first puzzle element is satisfied, erases the coupled puzzle element from the game area.

Advantages

According to the game system, the game method, the game program, and the game server according to the present disclosure, a game system, a game method, a game program, and a game server which improve a degree of freedom of movement of a puzzle element and which enable a game to be executed at a good pace can be provided.

DETAILED DESCRIPTION

<Overview of Game System 1>

Figure 1:
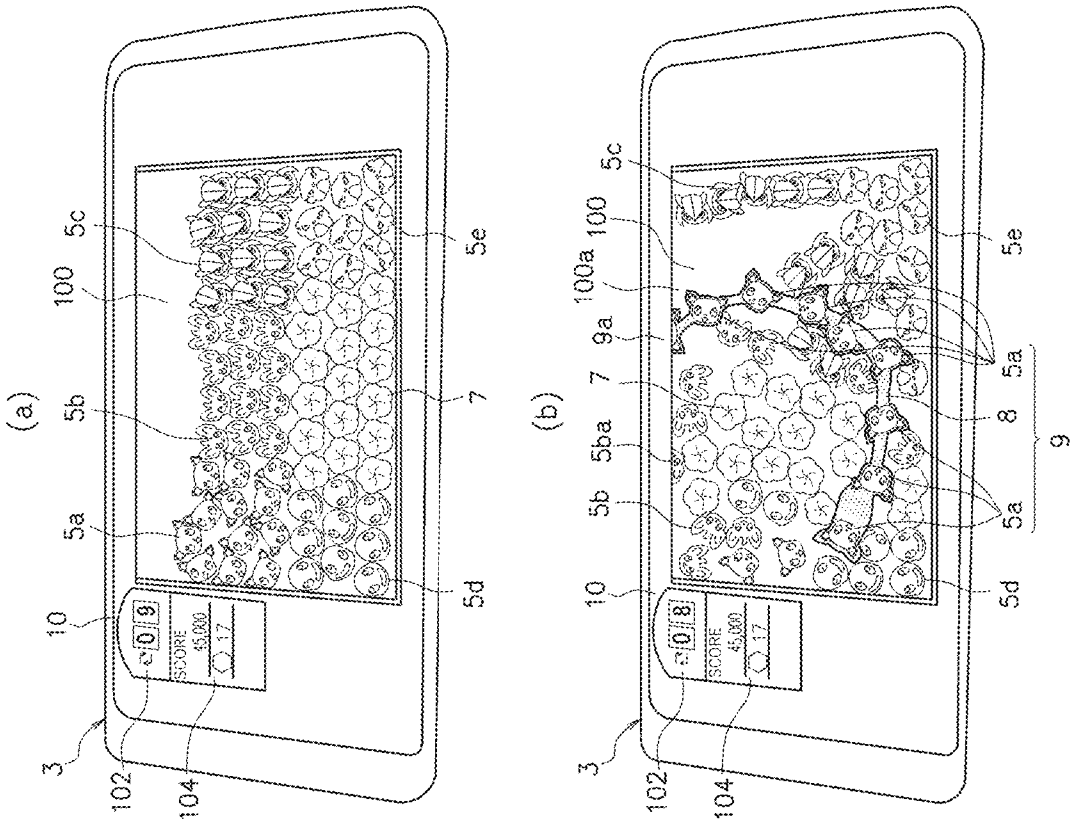
FIG. 1 is a schematic view of a game system according to one or more aspects of the present disclosure.

A game system 1 according to one or more aspects of the present disclosure is a game system which can be executed on an information terminal such as a smartphone and which is capable of imparting, using one or more puzzle elements of one or more types in a game area displayed on a display portion of the information terminal, a predetermined action to a puzzle element and/or a predetermined object. In the game system 1, a puzzle element can be moved to any position in the game area in accordance with an operation of a player, and when the puzzle element comes into contact with another puzzle element of a same type, a coupled puzzle element in which the puzzle element and the other puzzle element are coupled to each other is automatically generated. In addition, when the puzzle element or the coupled puzzle element comes into contact with a puzzle element of a type that differs from the puzzle element, the puzzle element of the different type executes a predetermined operation. An example of the predetermined operation is an operation in which the puzzle element of the different type is flicked away by the puzzle element or the coupled puzzle element, and the puzzle element of the different type that is flicked away moves inside the game area in a direction in which the puzzle element of the different type is flicked away.

In addition, in the game system 1, a puzzle element or a coupled puzzle element may be erased from the game area when a predetermined condition is satisfied. When the puzzle element or the coupled puzzle element is erased from the game area, the game system 1 can cause a predetermined action to be imparted to an object in contact with or an object present in a vicinity of the puzzle element or the coupled puzzle element. Examples of the predetermined action include actions such as destroying the object, erasing the object, and moving the object.

In this manner, in the game system 1, a degree of freedom of movement is provided which enables a puzzle element to be moved to any position in the game area. Accordingly, in the game system 1, even when a plurality of puzzle elements of a plurality of types are randomly present in the game area, by having a player move a puzzle element selected by the player to anywhere in the game area, a coupled puzzle element in which the puzzle element is coupled to one or more puzzle elements with a same appearance can be formed. In addition, the coupled puzzle element can also be freely moved inside the game area in accordance with an operation of the player.

Furthermore, when a puzzle element of a type that differs from a type of a puzzle element or a coupled puzzle element moving inside the game area or a type of the puzzle element constituting a coupled puzzle element or an object comes into contact with the puzzle element or the coupled puzzle element, the game system 1 can cause the puzzle element of the different type or the object to execute a predetermined operation (for example, an operation of being flicked away). Therefore, a puzzle element or a coupled puzzle element being operated by a player can move while bulldozing its way through puzzle elements of different types or objects that are present in the game area. As a result, in the game system 1, using a puzzle element or a coupled puzzle element operated by a player, other puzzle elements and/or objects inside the game area can be mixed up or positions of the other puzzle elements and/or the objects inside the game area can be changed from initial positions.

Therefore, in the game system 1, by moving a puzzle element or a coupled puzzle element inside the game area, the coupled puzzle element can be given a shape desired by the player or the coupled puzzle element can be brought into contact with a predetermined object desired by the player and a predetermined action can be imparted to the predetermined object when the coupled puzzle element is erased or the like. Accordingly, in the game system 1, since a puzzle element and/or a coupled puzzle element can be freely moved in accordance with a player's intentions, a game can be executed at a good pace.

FIG. 1 shows an overview of a game system according to one or more aspects of the present disclosure. Specifically, the example shown in FIG. 1(*a*) represents an example in which a game is executed on an information terminal 3 and a state at the start of execution of the game is displayed on a display portion 10 (for example, a display screen of the information terminal 3) having a touch panel, and FIG. 1(*b*) shows an overview of an example of a game being executed.

First, as shown in FIG. 1(*a*), at the start of the game, the game system 1 arranges one or more puzzle elements of one or more types in a game area 100 of the display portion 10 of the information terminal 3. For example, the game system 1 arranges a plurality of puzzle elements 5*a*, a plurality of puzzle elements 5*b*, a plurality of puzzle elements 5*c*, a plurality of puzzle elements 5*d*, a plurality of puzzle elements 5*e*, and a plurality of objects 7 in the game area 100. While each puzzle element and each object are arranged in a relatively organized manner in the example shown in FIG. 1(*a*), the puzzle elements and the objects may be randomly arranged inside the game area 100.

The puzzle element may be an element of which an operation can be accepted from a player and an object may be an element which cannot be operated by a player. In addition, a puzzle element may be an element representing a characteristic (such as a face) of a predetermined character. Furthermore, the game system 1 may display, in a vicinity of the game area 100 on the display portion 10, a number-of-moves counter 102 indicating the number of moves allowed to a player in a game (for example, the number of selections of a game element or the like allowed to a player in a game), an attainment target 104 that is a target that the player is to attain in the game (for example, types and/or numbers of objects to be erased in a game, points, or the like), and/or a time during which the player can continue to select a puzzle element having been selected by the player (a player-selectable time).

Next, when the player selects a puzzle element in the game area 100, the game system 1 movably controls the selected puzzle element to any position in the game area 100 in accordance with an operation of the player. For example, a case where the player selects (for example, by touching the display portion 10 with a finger) one puzzle element 5*a* from a plurality of puzzle elements as shown in FIG. 1(*b*) will be described. In this case, the game system 1 moves the one puzzle element 5*a* in the game area 100 in accordance with the player maintaining the touched state and sliding the finger on the display portion 10. The game system 1 is capable of movably controlling puzzle elements in any direction including upward and downward, leftward and rightward, and oblique directions as long as the moves occur inside the game area 100.

In addition, when the player moves the one puzzle element 5*a* and the one puzzle element 5*a* comes into contact with another puzzle element 5*a* (a puzzle element of a same type as the one puzzle element 5*a*), the game system 1 couples the other puzzle element 5*a* to the one puzzle element 5*a* and forms a coupled puzzle element 9. Every time another puzzle element 5*a* not having formed the coupled puzzle element 9 comes into contact with the one puzzle element 5*a*, the game system 1 couples the other contacting puzzle element 5*a* to the one puzzle element 5*a* or, when a coupled puzzle element 9 has already been formed, to the coupled puzzle element 9. When the game system 1 couples one or more puzzle elements 5*a* to the one puzzle element 5*a*, for example, the game system 1 forms a chain-like coupled puzzle element 9 and couples the plurality of puzzle elements 5*a* to each other with coupling areas 8 (for example, linear areas). A length and/or a thickness of the coupling area 8 may or may not be constant.

In addition, in accordance with an operation of the player with respect to the one puzzle element 5*a* or, in other words, a top puzzle element 5*a* of the coupled puzzle element 9, the game system 1 makes the coupled puzzle element 9 freely movable in the game area 100. When a puzzle element (the puzzle element 5*b* or the like) of a different type to the type of the puzzle element 5*a* and the object 7 come into contact with the one puzzle element 5*a* and the coupled puzzle element 9, the game system 1 controls the puzzle element of the different type and the object 7 so as to be flicked away (or bulldozed) by the one puzzle element 5*a* or the coupled puzzle element 9. For example, as shown in FIG. 1(*b*), the game system 1 performs control such that the object 7, the puzzle element 5*c*, the puzzle element 5*d*, and the like are flicked away by the coupled puzzle element 9, the flicked object 7, the puzzle element 5*c*, and the like further collide with another object 7, another puzzle element 5*c*, and the like, and the collided object 7, the collided puzzle element 5*c*, and the like are further flicked away.

In this case, the game system 1 can provide a virtual game area which is connected to a part of an edge of the game area 100 and which is invisible to the players. For example, in the example shown in FIG. 1(*b*), the virtual game area can be provided on a side of an upper side 100*a* of the game area 100 in a front view. The game system 1 can also control, so as to be present in the virtual game area, an object or a puzzle element having been flicked away by the one puzzle element 5*a* or the coupled puzzle element 9 being operated by a player, an object or a puzzle element further flicked away by the flicked object or the flicked puzzle element, and/or a puzzle element 5*a* near an end of an opposite side of the coupled puzzle element 9 to the puzzle element 5*a* being controlled by the player based on a flicked state, a movement path of the coupled puzzle element 9, and the like. In the example shown in FIG. 1(*b*), a puzzle element 5*ba* having been flicked away by the coupled puzzle element 9 is flicked to the virtual game area and a part 9*a* of an end of the coupled puzzle element 9 is also positioned in the virtual game area based on an operation of the player. Accordingly, the game system 1 can make objects and puzzle elements be present in the virtual game area in addition to the game area 100 and can widen a range of fun offered by the game.

Next, when a player ends an operation with respect to one puzzle element 5*a* (for example, when the player ends a touch operation with respect to the one puzzle element 5*a*) or when a predetermined time has elapsed from start of an operation of a player with respect to one puzzle element 5*a* even though the operation is ongoing, the game system 1 erases the one puzzle element 5*a* and the coupled puzzle element 9 being operated by the player from the game area 100. Accordingly, a predetermined reward (points, an item, or the like) is given to the player. In addition, when erasing the one puzzle element 5*a* and the coupled puzzle element 9, the game system 1 imparts a predetermined action to the object 7 satisfying a predetermined action condition such as being in contact with or being present in a vicinity of the one puzzle element 5*a*, the coupled puzzle element 9, and/or the coupling area 8. The predetermined action is, for example, an action of changing a size or a state of the object 7 or an action of moving the object. As an example, when the predetermined action is imparted to the object 7 a predetermined number of times, the game system 1 may erase the object 7 from the game area 100. The game system 1 gives the player a predetermined reward based on a type or the number of the erased object 7, a position in the game area 100 of the erased object 7, or the like.

As described above, in a game of which an object is to, for example, erase the object 7 by imparting a predetermined action to the object 7 a predetermined number of times, the game system 1 enables a player to freely select a game element and to form the coupled puzzle element 9 while operating the selected game element and freely moving the selected game element in the game area 100. In addition, by moving the coupled puzzle element 9 in the game area 100 so as to come into contact with the object 7 in an appropriate manner while bulldozing its way through puzzle elements of a different type to that of the selected puzzle element and erasing the coupled puzzle element 9 at a predetermined timing, the player can impart a predetermined action to the object 7. Accordingly, due to the game system 1, the player can enjoy the game at a good pace without undermining strategic characteristics of the game. In addition, due to the game system 1, since an arrangement of a plurality of puzzle elements and objects in the game area 100 continually changes in accordance with the player moving the coupled puzzle element 9, contingency in the arrangement of the puzzle elements and the objects can also be enjoyed.

The information terminal 3 is an information terminal such as a mobile phone, a smartphone, a notebook PC, a tablet PC, a PC, a portable game machine, and/or a home-use game machine. In addition, while details of the game system 1 according to one or more aspects of the present disclosure will be described below, it is to be understood that names, numerical values, and the like in the description given above and the description given below are merely exemplary, that the present disclosure is not limited to such names, numerical values, and the like, and that such names, numerical values, and the like are not necessarily related to actual names, numerical values, and the like.

<Details of Game System 1>

Figure 2:
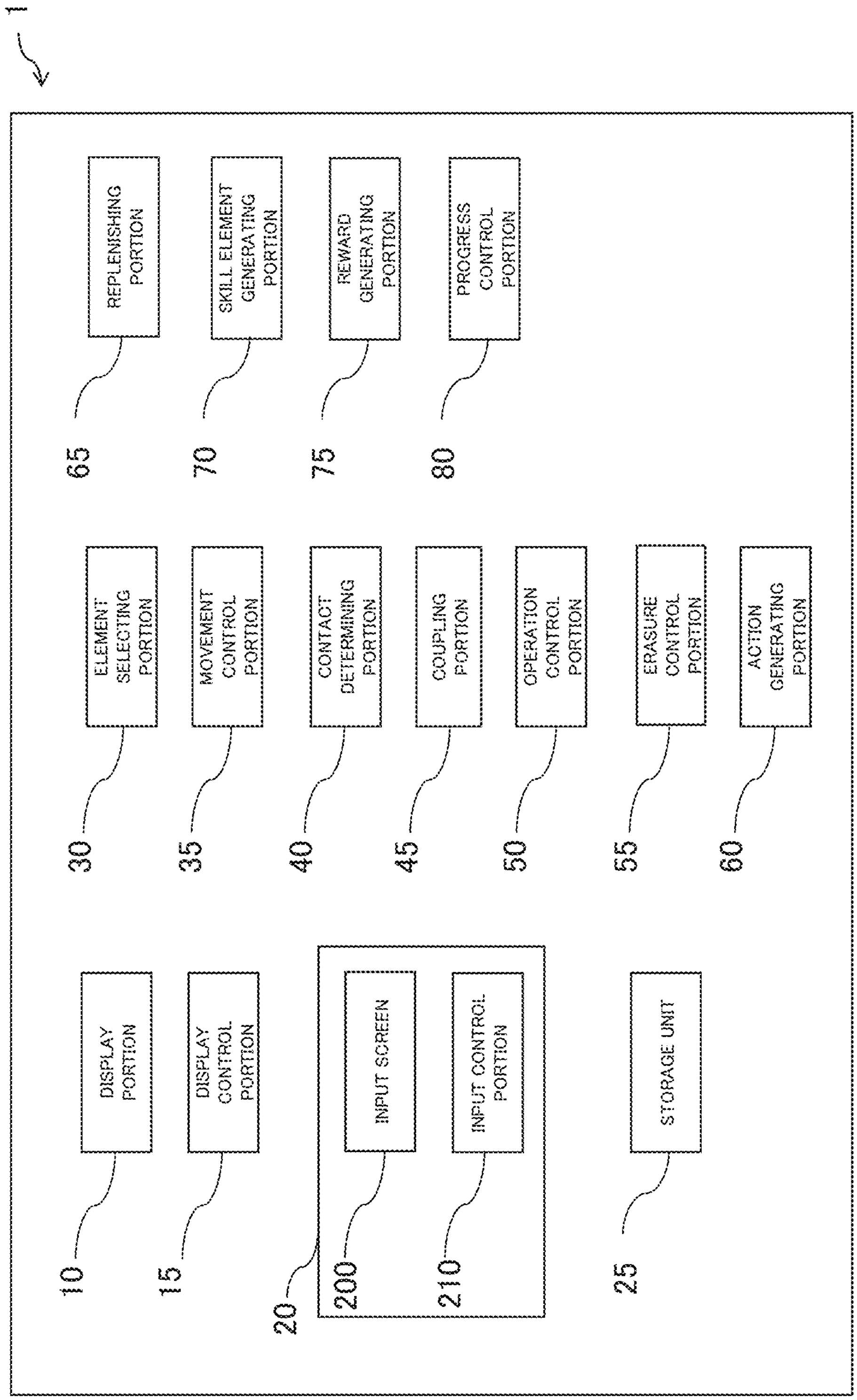
FIG. 2 is a block diagram of a functional configuration of the game system according to one or more aspects of the present disclosure.
Figure 3:
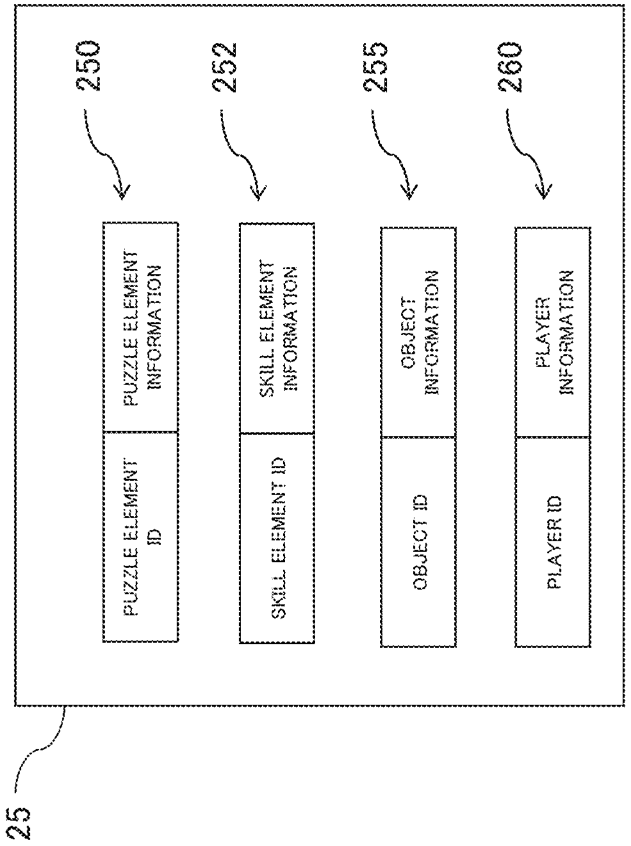
FIG. 3 is a data configuration diagram of each storage portion included in a storage unit according to one or more aspects of the present disclosure.

FIG. 2 is a diagram showing a functional configuration of the game system according to one or more aspects of the present disclosure. In addition, FIG. 3 shows an example of a data configuration of each storage portion included in a storage unit included in the game system according to one or more aspects of the present disclosure.

[Overview of Configuration of Game System 1]

The game system 1 according to the one or more aspects of the present disclosure is a game system that enables a game using a puzzle element to be executed in the game area 100. The game system 1 includes: the display portion 10 which displays the game area 100 and the like; a display control portion 15 which controls display of the display portion 10; an input portion 20 which accepts an instruction from a player; a storage unit 25 which stores various kinds of information used in a game; an element selecting portion 30 which selects a puzzle element or the like; a movement control portion 35 which controls a movement of a puzzle element or the like; a contact determining portion 40 which determines a presence or absence of contact by a puzzle element with another puzzle element; a coupling portion 45 which couples puzzle elements to each other or skill elements to each other; an operation control portion 50 which controls an operation of another puzzle element or the like having come into contact with a puzzle element or a coupled puzzle element; an erasure control portion 55 which controls erasure of a puzzle element and a coupled puzzle element from the game area 100; an action generating portion 60 which generates a predetermined action on an object; a replenishing portion 65 which replenishes a puzzle element to the game area 100; a skill element generating portion 70 which generates a skill element; a reward generating portion 75 which generates a reward with respect to a player; and a progress control portion 80 which controls progress of a game.

The storage unit 25 includes: a puzzle element information storage portion 250 which stores information related to a puzzle element; a skill element information storage portion 252 which stores information related to a skill element; an object information storage portion 255 which stores information related to an object; and a player information storage portion 260 which stores information related to a player.

Instead of only physically having the plurality of components described above in a same apparatus or at a same place, the game system 1 may install a part of the plurality of components described above at a physically separated position. In this case, each component may be connected by, for example, a communication network such as the Internet. For example, the game system 1 may have an external server bear a part of the functions of the components. In addition, the game system 1 may be configured as one or more servers. In this case, the game system 1 is configured by combining an information terminal, components of one server, and components of another server. In addition, in one or more aspects of the present disclosure, an aggregation of predetermined components can be perceived as one "information processing apparatus" and the game system 1 may be formed as an aggregation of a plurality of information processing apparatuses. A method for distributing a plurality of functions required for realizing the game system 1 according to one or more aspects of the present disclosure to one or a plurality of pieces of hardware can be appropriately determined in consideration of the processing capability of each piece of hardware and/or specifications required for the game system 1, and the like. Furthermore, various kinds of information stored in the storage unit 25 may be updated by an instruction by a user or information accepted via the input portion 20 or updated as need by acquiring predetermined information from a predetermined server which is present outside of the game system 1.

<Details of Configuration of Game System 1>

In the following description, a case where a game provided by the game system 1 is executed by a player mainly using the information terminal 3 (for example, a smartphone) will be described as an example. The information terminal 3 is configured so as to at least include the display portion 10 and the input portion 20.

(Display portion 10, Display Control Portion 15)

The display portion 10 is controlled by the display control portion 15 and displays the game area 100 in which the game is to be executed, one or more puzzle elements of one or more types, one or more objects, and one or more skill elements to be arranged in the game area 100, and/or information related to various other games. The display portion 10 outputs various processing results and information stored in the storage unit 25 so as to be perceivable by a player. Specifically, the display control portion 15 causes various processing results in each component, information stored in the storage unit 25, and the like to be displayed by the display portion 10 as data, a still image, a moving image, and/or a text of predetermined formats. The display portion 10 may display information received from an external server.

While an example where a shape of the game area 100 is a rectangle will be described in one or more aspects of the present disclosure, the shape of the game area 100 is not limited to a rectangle and the game area 100 can be made into various shapes such as a circular shape, an elliptical shape, a trapezoidal shape, a star shape, a shape created by coupling, to a rectangle, an area of a predetermined shape (for example, a rectangular shape or a trapezoidal shape) with a size that differs from the rectangle, and a shape having a protrusion or a depression in a part thereof. In addition, the display control portion 15 may cause a part of a puzzle element to be displayed outside of the game area 100 as long as a large portion (at least half or more) of an area of the puzzle element is positioned inside the game area 100 in the display area of the display portion 10. Accordingly, dynamism of a motion of a puzzle element can be enhanced.

(Input Portion 20, Input Screen 200, Input Control Portion 210)

The input portion 20 accepts an input such as a predetermined instruction or an operation from a player. The input portion 20 supplies the instruction to a predetermined component of the game system 1. Each component having accepted the instruction exhibits a predetermined function. For example, the input portion 20 is a touch panel, a tablet, a mouse, a motion sensor, or the like. In one or more aspects of the present disclosure, an example where the input portion 20 is a touch panel included in the information terminal 3 will be described. Note that the touch panel may be multi-touch-detectable. Specifically, the touch panel as the input portion 20 includes an input screen 200 to which an operation and the like by a player are input and an input control portion 210 which acquires information related to the operation input to the input screen 200. The touch panel is arranged so as to overlap with the display portion 10 and a surface of the touch panel corresponds to the input screen 200.

The input screen 200 detects a position designated by an operation (for example, a touch operation, a tap operation, or a slide operation) by the player with respect to the input screen 200. The input screen 200 supplies detected information or, in other words, positional information indicating a detected position to the input control portion 210. The input control portion 210 acquires the positional information from the input screen 200 and supplies the positional information to the element selecting portion 30 and the movement control portion 35.

(Storage Unit 25)

The storage unit 25 stores various kinds of information related to the game system 1. Each storage portion included in the storage unit 25 supplies predetermined information to a predetermined component in accordance with a request from other components in the game system 1.

(Storage Unit 25: Puzzle Element Information Storage Portion 250)

The puzzle element information storage portion 250 stores information related to a puzzle element used in a game. A puzzle element is an element that can be operated by a player. Specifically, the puzzle element information storage portion 250 stores puzzle element information in association with a puzzle element ID for identifying a puzzle element. Examples of the puzzle element information include a type of a puzzle element, a name of the puzzle element (for example, a character name such as Eevee or Charmander), a player-selectable time, and/or an image or the like of the puzzle element.

(Storage Unit 25: Skill Element Information Storage Portion 252)

The skill element information storage portion 252 stores information related to a skill element having a skill to generate a predetermined effect in a predetermined area of the game area 100 in accordance with an instruction by a player. The skill element is an element which is generated in the game area 100 by the skill element generating portion 70 when a predetermined condition is satisfied. In addition, the effect of the skill element can be generated in a predetermined area such as an area centered on the skill element and including a predetermined distance therefrom or an area centered on the skill element and including a predetermined distance therefrom in a predetermined direction. Furthermore, with respect to a puzzle element and/or an object included in the area where the effect is to be generated, the effect may be, for example, an effect of erasing, deforming, damaging, or moving the puzzle element and/or the object.

Specifically, the skill element information storage portion 252 stores skill element information in association with a skill element ID for identifying a skill element. Examples of the skill element information include information on an effect of a skill element, a direction/range in which the effect extends, a skill element generation condition, and/or an image or the like of the skill element.

(Storage Unit 25: Object Information Storage Portion 255)

The object information storage portion 255 stores information related to an object used in a game. An object may refer to an element which cannot be operated by a player and which is erased when a predetermined condition is satisfied. Specifically, the object information storage portion 255 stores object information in association with an object ID for identifying an object. Examples of the object information include information on a type of an object, a name of the object, an image of the object, and/or an erasure condition or the like of the object.

(Storage Unit 25: Player Information Storage Portion 260)

The player information storage portion 260 stores information related to a player who plays a game. Specifically, the player information storage portion 260 stores player information in association with a player ID for identifying a player. Examples of the player information include information on a name of a player, a character acquired by the player, a reward won by the player (including points, privileges, and scores acquired by executing the game), or the like.

(Element Selecting Portion 30)

In accordance with an operation of the player accepted by the input portion 20 (in other words, a touch operation or the like being an input operation of the player with respect to the input screen 200), the element selecting portion 30 selects a puzzle element (hereinafter, referred to as a "first puzzle element") desired by the player from one or more puzzle elements of one or more types in the game area 100. In other words, the element selecting portion 30 compares a position of a puzzle element arranged in the game area 100 and positional information received from the input control portion 210 with each other and selects a puzzle element present at a position indicated by the positional information as the first puzzle element.

The element selecting portion 30 selects the first puzzle element while an operation of the player is being accepted by the input portion 20 or while the input portion 20 accepts an operation of the player and before the erasure control portion 55 (to be described later) erases the first puzzle element. Specifically, the element selecting portion 30 selects a puzzle element present in positional information of a position selected by the player by a touch operation as the first puzzle element from a plurality of puzzle elements displayed in the game area 100. In addition, when the element selecting portion 30 selects the first puzzle element, the element selecting portion 30 refers to the puzzle element information storage portion 250 and acquires information indicating a type of the first puzzle element. The element selecting portion 30 supplies positional information of the selected first puzzle element to the movement control portion 35. In addition, the element selecting portion 30 supplies information (type information) indicating a type of the first puzzle element to the contact determining portion 40. Furthermore, the element selecting portion 30 supplies information indicating a time point of selection of the first puzzle element and information indicating whether or not the first puzzle element is selected to the erasure control portion 55. Hereinafter, it is to be understood that a skill element can be handled in a similar manner to a puzzle element unless otherwise restricted.

(Movement Control Portion 35)

The movement control portion 35 moves the first puzzle element selected by the element selecting portion 30 in the game area 100 in accordance with an operation of the player. In other words, the movement control portion 35 moves the first puzzle element in the game area 100 in accordance with a detection result of an operation of the player (for example, a motion of a finger or the like of the player) by the input portion 20. While the first puzzle element having been selected by the player is being selected by the player or while the first puzzle element is being selected by the player and before the erasure control portion 55 (to be described later) erases the first puzzle element, the movement control portion 35 moves the first puzzle element freely in the game area 100 in accordance with an operation of the player. Specifically, the movement control portion 35 acquires positional information indicating a position of the first puzzle element in the game area 100 from the input portion 20. In addition, based on the positional information of the first puzzle element received from the movement control portion 35, the display control portion 15 causes the display portion 10 to display a situation where the first puzzle element is moving in the game area 100.

In addition, in one or more aspects of the present disclosure, for example, unlike a game area with a matrix pattern, a puzzle element can be arranged at any position (in other words, a puzzle element can be moved to any position) in the game area 100. In other words, a puzzle element can be present at any position in the game area 100 in accordance with an operation of a player (however, when an area prohibiting movements of puzzle elements is provided in the game area 100, a position excluding such an area). The movement control portion 35 supplies the positional information of the first puzzle element in the game area 100 to the contact determining portion 40.

(Contact Determining Portion 40)

The contact determining portion 40 determines a presence or absence of a contact between the first puzzle element being operated by the player and another puzzle element and a contact between the first puzzle element and an object. In addition, the contact determining portion 40 determines, by referring to the puzzle element information storage portion 250, whether or not a type indicated by the type information of the first puzzle element having been received from the element selecting portion 30 and a type indicated by type information of another puzzle element having come into contact with the first puzzle element being operated by the player are a same type. Note that puzzle elements being of a same type may refer to appearances (in other words, external design (physical appearance)) of the puzzle elements being the same. In addition, puzzle elements "coming into contact" with each other includes a state where the puzzle elements "collide" with each other and a state where the puzzle elements "abut against" each other. Conventional and known contact determination (collision determination) algorithms can be used for contact (collision) determination between puzzle elements by the contact determining portion 40. The contact determining portion 40 supplies information indicating a determination result to the coupling portion 45, the operation control portion 50, and the action generating portion 60.

(Coupling Portion 45)

When the first puzzle element selected by the element selecting portion 30 (in other words, the first puzzle element moving in the game area 100 in accordance with an operation of the player) is collided with another puzzle element (a puzzle element of a same type as the first puzzle element and/or a puzzle element of a different type) under a predetermined condition, the coupling portion 45 couples the first puzzle element and the contacting puzzle element to each other. For example, when the first puzzle element selected by the element selecting portion 30 is collided with a puzzle element of a same type as the first puzzle element, the coupling portion 45 couples the first puzzle element and the puzzle element of the same type to each other and generates a coupled puzzle element having the first puzzle element and the puzzle element of the same type as components. In other words, when the determination result of the contact determining portion 40 indicates that the type of the other puzzle element having come into contact with the first puzzle element and the type of the first puzzle element are the same type, the coupling portion 45 couples the first puzzle element and the other puzzle element to each other and generates a coupled puzzle element.

In addition, when the first puzzle element constituting the coupled puzzle element (in other words, a top first puzzle element) further comes into contact with a puzzle element of a same type, the coupling portion 45 couples the puzzle element of the same type to the coupled puzzle element and generates a new coupled puzzle element. In other words, when a plurality of puzzle elements of a same type come into contact with the first puzzle element or when a plurality of puzzle elements of a same type sequentially come into contact with the first puzzle element, the coupling portion 45 generates a coupled puzzle element in which the plurality of puzzle elements of a same type are coupled to the first puzzle element in a chain. In this case, the coupling portion 45 can couple the plurality of puzzle elements constituting the coupled puzzle element (however, the top puzzle element is the first puzzle element being operated by the player) to each other by coupling areas. In this case, various shapes can be adopted as a shape of the coupling area. For example, the coupling area may have various shapes such as a thin linear shape, a wide linear shape, a dotted-line shape, a shape created by connecting a plurality of rectangles, a shape created by connecting a plurality of circles or ellipses, and a band-like shape of which a width changes continuously or irregularly between one puzzle element and a puzzle element adjacent to the one puzzle element. Here, a case where the coupling area is a variable-length and/or variable-width coupling line will be described as an example.

In this case, in accordance with an operation of the player with respect to the first puzzle element (the first puzzle element being selected by the player), the movement control portion 35 moves the coupled puzzle element in the game area 100 with the first puzzle element at the top. The movement control portion 35 moves the one or more trailing puzzle elements excluding the top puzzle element so as to follow the movement of the top first puzzle element. In this case, the coupling portion 45 may vary a distance between the plurality of puzzle elements constituting the coupled puzzle element in accordance with a movement speed of the top first puzzle element (the first puzzle element being operated by the player) to change a length and/or a width of the coupling lines that couple the plurality of puzzle elements to each other. For example, the higher the movement speed, the longer and/or narrower the coupling lines, and the lower the movement speed, the shorter and/or wider the coupling lines. In addition, when there are a plurality of coupling lines, a length and/or a width of each coupling line may be the same or may differ from one another. However, preferably, a maximum length is determined with respect to the length of the coupling line and a maximum width is determined with respect to the width of the coupling line. Furthermore, the display control portion 15 causes the display portion 10 to display a coupled puzzle element based on processing results of the element selecting portion 30, the movement control portion 35, and the coupling portion 45. Accordingly, a player can be given the impression that the coupled puzzle element is moving with vibrancy.

When the coupling portion 45 further couples a puzzle element to the coupled puzzle element, while there is no limit to a coupling position of a puzzle element to be newly coupled (a new puzzle element), for example, the coupling portion 45 may couple the new puzzle element to the coupled puzzle element by inserting the new puzzle element between the top first puzzle element constituting the coupled puzzle element and the puzzle element coupled next to the first puzzle element. For example, let us assume that, when the coupled puzzle element is made up of two puzzle elements, namely, the top first puzzle element (referred to as a "puzzle element A") and a puzzle element (referred to as a "puzzle element B") that is coupled to the first puzzle element, a puzzle element (referred to as a "puzzle element C") of a same type as the first puzzle element comes into contact with the first puzzle element. In this case, the coupling portion 45 incorporates the puzzle element C between the puzzle element A and the puzzle element B and generates a coupled puzzle element with a structure expressed as "puzzle element A-puzzle element C-puzzle element B". The "-" portion indicates a coupling line.

In addition, when the coupling portion 45 couples a new puzzle element to a coupled puzzle element, the display control portion 15 may enlarge a display of the new puzzle element to be coupled for a predetermined time and at a predetermined magnification. For example, when the coupling portion 45 incorporates the puzzle element C between the puzzle element A and the puzzle element B in the example described above, the display control portion 15 causes the display portion 10 to enlarge the display of the puzzle element C for a predetermined time and at a predetermined magnification. Accordingly, since a puzzle element of a same type as the first puzzle element being operated by the player having come into contact with the first puzzle element can be coupled as though the puzzle element is drawn into the first puzzle element, the player can be given a feeling that the coupling is being carried out.

The contact determining portion 40 also determines a presence or absence of a contact between the coupled puzzle element being operated by a player (by operating the top first puzzle element, the coupled puzzle element is also operated) and another puzzle element and/or an object. In addition, the coupling portion 45 determines whether or not to couple the other puzzle element to the coupled puzzle element depending on a contact determination (collision detection) of the other puzzle element with respect to the top first puzzle element of the coupled puzzle element by the contact determining portion 40. A range (in other words, a distance from an outer edge of the first puzzle element) in which a determination that "contact is made" is made in the contact determination may be the same regardless of a type of a puzzle element from the perspective of simplifying game play or may differ depending on the type of the puzzle element from the perspective of enhancing strategic characteristics.

In addition, in the example described above, the coupling portion 45 generates a coupled puzzle element in which the first puzzle element selected by the element selecting portion 30 is coupled to a puzzle element of a same type as the first puzzle element. However, the coupling portion 45 may generate a coupled puzzle element of a different form in accordance with a condition determined in advance. For example, let us consider a case where there is a first puzzle element (a puzzle element α) and a puzzle element β of a type that differs from the puzzle element α. In this case, the condition determined in advance may be a condition of generating a coupled puzzle element of an array having predetermined regularity. Examples of the condition may include a condition of generating a coupled puzzle element in which the puzzle element α and the puzzle element β are alternately arranged (in other words, coupling expressed as αβαβαβαβαβαβ . . . ), a condition of generating a coupled puzzle element in which a state where a predetermined number of consecutive puzzle elements of a same type (blocks) are repetitively arranged (in other words, coupling expressed as ααααααββββββααααααββββββ . . . ), and/or a condition of generating a coupled puzzle element in which a puzzle element corresponding to a main chain has a branch made of a puzzle element of a different type (in other words, coupling expressed as αααα (−ββββ) αααα (−ββββ) αααα . . . , where a side chain (branch) made of one or more β is coupled here and there to a main chain (stem) made of a plurality of α).

(Operation Control Portion 50)

When a first puzzle element or a coupled puzzle element moving in the game area 100 comes into contact with a puzzle element (hereinafter, referred to as a second puzzle element) of a different type from the first puzzle element and/or an object, the operation control portion 50 causes the second puzzle element and/or the object to execute a predetermined operation without coupling the first puzzle element and the second puzzle element to each other. An example of the predetermined operation is an operation in which the second puzzle element and/or the object collides with and is flicked away by the first puzzle element or the coupled puzzle element. In this case, the display control portion 15 causes the display portion 10 to display the second puzzle element and/or the object performing the predetermined operation determined by the operation control portion 50. When a puzzle element not constituting a coupled puzzle element, the second puzzle element, and/or an object comes into contact with and is flicked away by the first puzzle element or the coupled puzzle element and a direction of movement due to the flick is a direction of a virtual game area, the operation control portion 50 may move the puzzle element not constituting a coupled puzzle element, the second puzzle element, and/or the object from each of their positions toward the virtual game area.

(Erasure Control Portion 55)

When at least any one of a condition in that an operation of the player with respect to the first puzzle element selected by the element selecting portion 30 is no longer performed and a condition in that a predetermined time has elapsed from a time point at which the element selecting portion 30 had selected the first puzzle element although the operation of the player is ongoing is satisfied, the erasure control portion 55 erases, at a position where the first puzzle element or the coupled puzzle element is present in the game area 100 at a time point where the condition is satisfied, the first puzzle element or the coupled puzzle element from the game area 100. The "predetermined time" may be set to a different time depending on a type of a puzzle element. In this case, the erasure control portion 55 may use the player-selectable time stored in the puzzle element information storage portion 250 as the predetermined time. In addition, the display control portion 15 may start counting down the predetermined time from a time point at which the element selecting portion 30 had selected the first puzzle element and present a remaining time and/or an elapsed time to the player by causing the remaining time and/or the elapsed time to be displayed in the game area 100 or in a vicinity of the game area 100.

In addition, the display control portion 15 may change a display mode of a coupling area (for example, a color, a shape, or the like of the coupling area) in accordance with the number of puzzle elements that constitute a coupled puzzle element. For example, the display control portion 15 changes the color of the coupling area every time the number of puzzle elements that constitute a coupled puzzle element increases by a predetermined number. As an example, the display control portion 15 may change the color of the coupling area in accordance with the number of puzzle elements that constitute a coupled puzzle element such as making the color of the coupling area transparent when one to nine puzzle elements constitute the coupled puzzle element, making the color of the coupling area blue when 10 to 19 puzzle elements constitute the coupled puzzle element, and making the color of the coupling area red when 20 to 29 puzzle elements constitute the coupled puzzle element. Accordingly, since a user can comprehend the number of puzzle elements that constitute a coupled puzzle element without referring to outside of the field of the game area during game play, for example, the user can readily comprehend how much reward (such as points) can be acquired by erasing the coupled puzzle element. Furthermore, the display control portion 15 can change a display mode of the coupling area in accordance with a remaining time from the time point at which the element selecting portion 30 had selected the first puzzle element until a predetermined time elapses. Specifically, the display control portion 15 may change the color of the coupling area, cause the display of the coupling area to blink, or change a blink rate in accordance with the remaining time. For example, when a coupling area is formed, the display control portion 15 causes the display of the coupling area to blink at a predetermined blink rate. In addition, the display control portion 15 changes the blink rate in accordance with a decrease in a remaining time. As an example, the display control portion 15 can increase or reduce the blink rate. From the perspective of further emphasizing the fact that there is not much time left, the display control portion 15 may increase the blink rate in accordance with a decrease in the remaining time.

Furthermore, the display control portion 15 erases, from the display portion 10, the first puzzle element and/or the coupled puzzle element having been erased by the erasure control portion 55. In addition, when performing the erasure, the display control portion 15 may add a display effect such as an explosion to an area where the first puzzle element and/or the coupled puzzle element to be erased is present and/or a periphery of the area. The erasure control portion 55 supplies information indicating a type and/or the number of the erased first puzzle element or types and/or numbers of puzzle elements constituting the erased coupled puzzle element to the replenishing portion 65 and the reward generating portion 75.

(Action Generating Portion 60)

When the erasure control portion 55 erases a first puzzle element or a coupled puzzle element, the action generating portion 60 generates a predetermined action on an object in contact with at least any one of the first puzzle element, the coupled puzzle element, or a coupling area, or on an object in a vicinity thereof. In this case, the display control portion 15 causes the display portion 10 to display a state of the object when the predetermined action generated by the action generating portion 60 is being exerted on the object and/or the state of the object after the predetermined action generated by the action generating portion 60 has been exerted on the object. Examples of the predetermined action include an action of destroying the object, an action of deforming the object, an action of erasing the object, an action of changing a color of the object, and an action of moving the object. When the action generating portion 60 erases an object, the action generating portion 60 supplies information indicating a type and/or the number of the erased object to the replenishing portion 65.

For example, when the erasure control portion 55 has erased a first puzzle element or a coupled puzzle element, the action generating portion 60 refers to an erasure condition of an object that is stored in the object information storage portion 255 and erases an object in contact with the first puzzle element, the coupled puzzle element, or a coupling area or a nearby object that satisfies the erasure condition from the game area 100. An example of the erasure condition is a condition of erasing an object when encountering an erasure of the first puzzle element, the coupled puzzle element, or the coupling area a predetermined number of times. Until the predetermined number of times set in the erasure condition is reached, the action generating portion 60 may generate a specific action such as an action of reducing a size of the object or an action of damaging the object in accordance with the number of times an erasure of the first puzzle element or the coupled puzzle element has been encountered.

In addition, when a player moves a first puzzle element at the top of a coupled puzzle element in the game area 100, the movement control portion 35 moves the coupled puzzle element in accordance with the movement. In this case, since the coupled puzzle element is a plurality of puzzle elements being coupled in a chain, the coupled puzzle element moves so as to follow the movement of the first puzzle element. Furthermore, puzzle elements can be moved to any position in the game area 100. Therefore, in addition to a straight chain shape, the coupled puzzle element can be made into a shape having a partial arc, a serpentine shape, a spiral shape, or the like in accordance with an operation of the player in the game area 100. Therefore, a plurality of portions of a coupled puzzle element can be brought into contact with a single object.

In this case, since an object is in contact with or in a vicinity of a plurality of locations of a coupled puzzle element to be erased by the erasure control portion 55, the action generating portion 60 may increase an effect of the predetermined action in accordance with the number of locations in contact and/or the number of locations where the object is determined to be in the vicinity of the coupled puzzle element (hereinafter, simply referred to as "number of contacts"). As an example, when one object is in contact with a plurality of locations of a coupled puzzle element, the action generating portion 60 increases an effect of an action to be generated on the one object in correspondence with the number of contacts. For example, when an erasure condition of one object is that the one object encounters an erasure of a coupled puzzle element twice and when a coupled puzzle element is erased in a state where the one object is in contact with the coupled puzzle element at two locations, the action generating portion 60 can erase the one object after encountering just one erasure of a coupled puzzle element even though the one object is supposed to be not erased unless the one object encounters two erasures of a coupled puzzle element.

(Replenishing Portion 65)

The replenishing portion 65 replenishes, to the game area 100, one or more puzzle elements of one or more types corresponding to the number of first puzzle elements erased by the erasure control portion 55 (when a coupled puzzle element has not been generated, the number of first puzzle elements is one) or a total number of the first puzzle elements constituting the coupled puzzle element and puzzle elements of a same type as the first puzzle element. In addition, the replenishing portion 65 can also replenish, to the game area 100, at least one or more puzzle elements of one or more types of a number corresponding to a sum of a total number of first puzzle elements erased by the erasure control portion 55 or the first puzzle elements constituting the coupled puzzle element and puzzle elements of a same type as the first puzzle element and a total number of the objects erased by the action generating portion 60. In this case, the display control portion 15 causes the one or more puzzle elements replenished by the replenishing portion 65 to be displayed in the game area 100 of the display portion 10. In addition, when replenishing a plurality of puzzle elements, the replenishing portion 65 may randomly determine a type of the puzzle elements to be replenished. In other words, in one or more aspects of the present disclosure, one or more puzzle elements of a predetermined number of types (for example, x-number of types or more, where x denotes a numeral equal to or more than 1) are arranged in the game area 100 at the start of a game. For example, the replenishing portion 65 can randomly determine a type of a puzzle element from the x-number of types. Furthermore, when the replenishing portion 65 replenishes a puzzle element, the display control portion 15 may replenish the puzzle element toward the game area 100 from a virtual game area that is connected to the game area 100.

(Skill Element Generating Portion 70)

The skill element generating portion 70 refers to a skill element generation condition that is stored in the skill element information storage portion 252 and generates a skill element having a skill to generate a predetermined effect in a predetermined area of the game area 100. For example, a skill element generation condition such as a condition that the number of puzzle elements constituting a coupled puzzle element is a predetermined number or more or a condition that a type of the puzzle elements constituting a coupled puzzle element is a predetermined type can be appropriately determined. For example, the skill element generating portion 70 may generate a skill element in a part of an area where the coupled puzzle element erased by the erasure control portion 55 had been present or supply a skill element toward the game area 100 from a virtual game area when the skill element generation condition is satisfied. In this case, the display control portion 15 causes the skill element generated by the skill element generating portion 70 or supplied to the game area 100 by the skill element generating portion 70 to be displayed in the game area 100 of the display portion 10.

In addition, when the skill element generating portion 70 generates a skill element, the element selecting portion 30 can make the skill element selectable in accordance with an operation of a player. Furthermore, the movement control portion 35 movably controls the skill element selected by the element selecting portion 30 in accordance with an operation of a player to any position in the game area 100 in accordance with an operation of the player. In this case, the movement control portion 35 may change an orientation of the skill element in accordance with an operation of the player. Accordingly, an area in which a predetermined effect of the skill element is exerted can be changed in accordance with intentions of the player.

In addition, a skill element selected by the element selecting portion 30 in accordance with an operation of a player is movably controlled by the movement control portion 35 to any position in the game area 100. Furthermore, when at least any one of a condition in that an operation of the player with respect to the skill element selected by the element selecting portion 30 is no longer performed and a condition in that a predetermined time has elapsed from a time point at which the element selecting portion 30 had selected the skill element even though an operation of the player is ongoing is satisfied, the erasure control portion 55 erases the skill element from the game area 100 at a position in the game area 100 where the skill element is present at a time point where the condition has been satisfied. In addition, in accordance with the erasure of the skill element, the action generating portion 60 generates a predetermined action set to the skill element on a puzzle element and/or an object present in a periphery of the skill element or, when an effect generated by the skill element has directionality, a predetermined area in a direction in which the skill element is oriented. Examples of the predetermined action include deforming, destroying, erasing, and moving the puzzle element or the object. In this case, the erasure control portion 55 supplies information indicating the number of erased skill elements to the replenishing portion 65 and the action generating portion 60 also supplies information indicating the number of erased puzzle elements and/or objects to the reward generating portion 75.

When the movement control portion 35 is moving one skill element in the game area 100 and another skill element of a same type as the one skill element comes into contact with the one skill element, the coupling portion 45 can also form a coupled skill element in which the other skill element is coupled to the one skill element. In this case, when a skill element or a coupled skill element moving in the game area 100 comes into contact with a puzzle element, an object, and a skill element (hereinafter, referred to as “another element”) that differs from the skill element or a skill element constituting the coupled skill element, the operation control portion 50 causes the other element to execute a predetermined operation. An example of the predetermined operation is an operation of the other element colliding with and flicked away by a skill element or a coupled skill element. The display control portion 15 causes the display portion 10 to display the other element performing the predetermined operation determined by the operation control portion 50. In addition, in accordance with an erasure of a coupled skill element, the action generating portion 60 may change an effect of a predetermined action in a case where a skill element constituting the coupled skill element is independently present. For example, compared to the predetermined action in a case where one skill element is erased, the action generating portion 60 may change a predetermined effect to an effect that is advantageous to a player when the coupled skill element is erased such as enlarging an generation range of the predetermined action or increasing an action exerted on a puzzle element or an object.

(Reward Generating Portion 75)

The reward generating portion 75 generates reward information to be given to a player based on a coupled puzzle element and/or a skill element erased by the erasure control portion 55 and/or a type and/or the number or the like of an object erased by a predetermined action generated on the object by the action generating portion 60. The reward generating portion 75 stores the generated reward information in the player information storage portion 260. In addition, the display control portion 15 may cause the reward information generated by the reward generating portion 75 to be displayed in a predetermined area in the display portion 10.

(Progress Control Portion 80)

The progress control portion 80 controls progress of a game. For example, the progress control portion 80 can determine, at the start of the game, a completion condition of the game, the number of moves that a player can execute in the game, and the like. The progress control portion 80 can end the game when the completion condition is satisfied, when the number of moves set by a predetermined operation of the player runs out, or the like. In addition, even when the number of moves described above runs out, the progress control portion 80 may add or restore the number of moves using a predetermined item in accordance with a selection by the player.

When the progress control portion 80 starts a game, the skill element generating portion 70 may select a skill element to be generated while the game is being executed in accordance with an instruction by a player and may generate the skill element in the game area 100 when a skill element generation condition is satisfied. In addition, for example, one or more puzzle elements of one or more types are arranged in the game area 100 at the start of the game (or immediately after the start of the game) by the progress control portion 80. The element selecting portion 30 selects one puzzle element from the arranged puzzle elements in accordance with an instruction by the player that is accepted via the input portion 20. In addition, the skill element generating portion 70 can also select a skill element to be generated while the game is being executed in accordance with a type of the selected puzzle element. In this case, the skill element information storage portion 252 stores a predetermined type of the puzzle element in further association with a skill element ID. Accordingly, since the player can generate a skill element in accordance with a puzzle element selected by the player himself/herself in the game, strategic characteristics of the game and a sense of anticipation toward generation of a skill element can be enhanced.

[Example of Operation of Puzzle Element of Game System 1]

Figure 4:
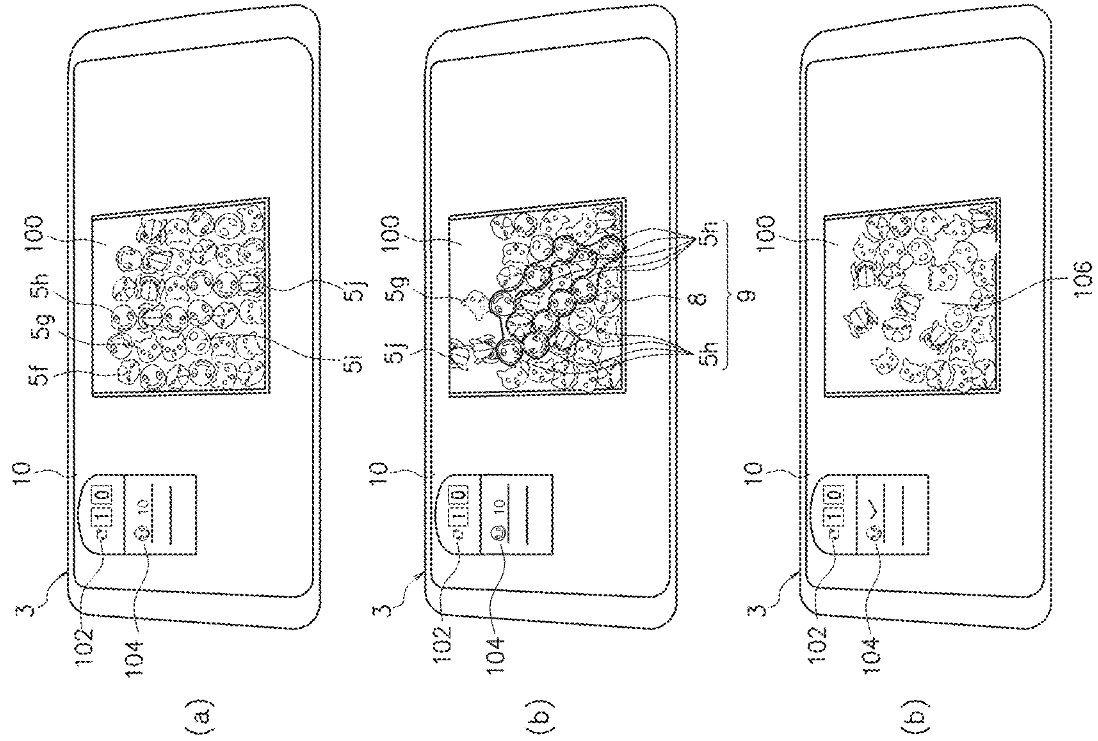
FIG. 4 is a schematic view of an operation of a puzzle element in the game system according to one or more aspects of the present disclosure.

FIG. 4 shows an overview of an example of an operation of a puzzle element in the game system according to one or more aspects of the present disclosure. Specifically, FIG. 4(*a*) shows an example of a display by the display portion 10 at the start of a game and FIG. 4(*b*) and FIG. 4(*c*) each show an example of a display by the display portion 10 during the game. The examples shown in FIG. 4 represent examples in which a plurality of puzzle elements of a plurality of types are arranged in the game area 100 and there are no objects, and fingers of a player are not illustrated.

First, as shown in FIG. 4(*a*), at the start of the game, the display control portion 15 causes the game area 100 to be displayed in a predetermined area of the display portion 10 of the information terminal 3. In addition, the display control portion 15 arranges a plurality of puzzle elements of a plurality of types in the game area 100 and causes the display portion 10 to display the puzzle elements. For example, the display control portion 15 randomly arranges a plurality of puzzle elements 5*f*, a plurality of puzzle elements 5*g*, a plurality of puzzle elements 5*h*, a plurality of puzzle elements 5*i*, and a plurality of puzzle elements 5*j* in the game area 100 and causes the display portion 10 to display the puzzle elements.

Next, the element selecting portion 30 selects one puzzle element from the plurality of puzzle elements in accordance with an operation of the player. In the example shown in FIG. 4(*b*), the element selecting portion 30 selects one puzzle element 5*h* in accordance with an operation of the player. In addition, the movement control portion 35 freely moves the one puzzle element 5*h* in the game area 100 in accordance with an operation of the player. In other words, the one puzzle element 5 can freely move in the game area 100 in any direction including upward and downward, leftward and rightward, and oblique directions, and even when the operation of the player (for example, an operation of a finger) is an operation of drawing an arc or a spiral on the display portion 10, the one puzzle element 5 moves so as to follow the operation.

The contact determining portion 40 determines whether or not a puzzle element that comes into contact with the puzzle element 5*h* being operated by the player is of a same type as the puzzle element 5*h*. When the puzzle element having come into contact with the puzzle element 5*h* being operated by the player is another puzzle element 5*h* of a same type, the coupling portion 45 couples the other puzzle element 5*h* of the same type to the puzzle element 5*h* being operated by the player. The coupling portion 45 repeats the coupling processing every time another puzzle element 5*h* of the same type comes into contact with the puzzle element 5*h* being operated by the player. Accordingly, as shown in FIG. 4(*b*), the coupled puzzle element 9 made up of a plurality of the puzzle elements 5*h* is generated.

The coupling portion 45 couples the plurality of puzzle elements 5*h* with the coupling area 8. In addition, the coupling portion 45 can change a shape (for example, a length, a width, and the like) of the coupling area 8 in accordance with movement control of the coupled puzzle element 9 by the movement control portion 35. For example, when the coupling area 8 has a linear shape, the coupling portion 45 can extend the length of the coupling area 8 in accordance with a speed at which the player moves the top puzzle element 5*h* of the coupled puzzle element 9. In addition, when the coupled puzzle element 9 is made up of a plurality of puzzle elements 5*h*, the coupling portion 45 may reduce a length of the coupling area 8 at a distant position from the top puzzle element 5*h* as compared to the coupling area 8 being coupled to the top puzzle element 5*h*.

On the other hand, when the contact determining portion 40 determines that a puzzle element having come into contact with the puzzle element 5*h* and the coupled puzzle element 9 is a puzzle element of a different type from the puzzle element 5*h*, the operation control portion 50 causes the puzzle element of the different type to execute a predetermined operation such as an operation of being flicked away by the puzzle element 5*h*. For example, a case will be described where, as shown in FIG. 4(*b*), one puzzle element 5*j* and one puzzle element 5*g* sequentially come into contact with the top puzzle element 5*h* of the coupled puzzle element 9. In this case, the operation control portion 50 causes each of the one puzzle element 5*j* and the one puzzle element 5*g* to execute an operation of being flicked away in a predetermined direction (upward in the example shown in FIG. 4(*b*)) in the game area 100. The flicked one puzzle element 5*j* and the flicked one puzzle element 5*g* each move upward in the game area 100. In addition, when a virtual game area is provided in the game area 100, the operation control portion 50 may cause the puzzle elements to execute an operation of being flicked away to the virtual game area but subsequently returning to the game area 100 by falling as is the case of the puzzle element 5*j* shown in FIG. 4(*b*).

In addition, when the operation of the player with respect to the top puzzle element 5*h* of the coupled puzzle element 9 selected by the element selecting portion 30 is no longer performed (for example, when the player ends a touch operation with respect to the puzzle element 5*h*) or when a predetermined time has elapsed from a time point where the element selecting portion 30 had selected the top puzzle element 5*h*, the erasure control portion 55 erases the coupled puzzle element 9 as shown in FIG. 4(*c*). The erasure control portion 55 can also add a display effect such as an emission of light or an explosion to a periphery of the puzzle element and the coupled puzzle element to be erased.

Furthermore, the reward generating portion 75 gives a reward such as a score to the player in accordance with the number of puzzle elements 5*h* constituting the erased coupled puzzle element 9. In addition, after the erasure of the coupled puzzle element 9, a space 106 is formed in an area where the coupled puzzle element 9 had existed in the game area 100. After the space 106 is formed, puzzle elements that are present above the space 106 move (fall) toward the space 106. Moreover, since the coupled puzzle element 9 has been erased, the replenishing portion 65 replenishes a same number of puzzle elements as the number of puzzle elements 5*h* that had made up the coupled puzzle element 9 to the game area 100. A type of the puzzle elements to be replenished by the replenishing portion 65 may be a predetermined type selected from the puzzle element 5*f*, the puzzle element 5*g*, the puzzle element 5*h*, the puzzle element 5*i*, and the puzzle element 5*j* or a type randomly determined from the puzzle element 5*f*, the puzzle element 5*g*, the puzzle element 5*h*, the puzzle element 5*i*, and the puzzle element 5*j*.

[Example of Action on Object of Game System 1]

Figure 5:
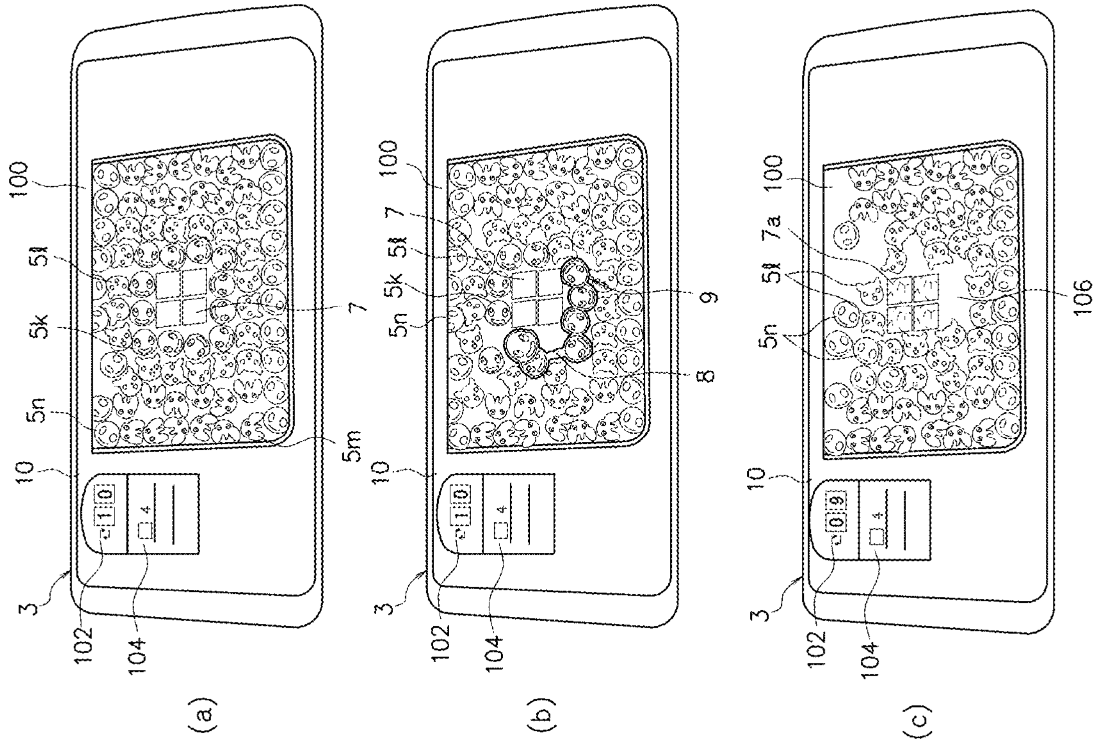
FIG. 5 is a schematic view of an action with respect to an object in the game system according to one or more aspects of the present disclosure.
Figure 6:
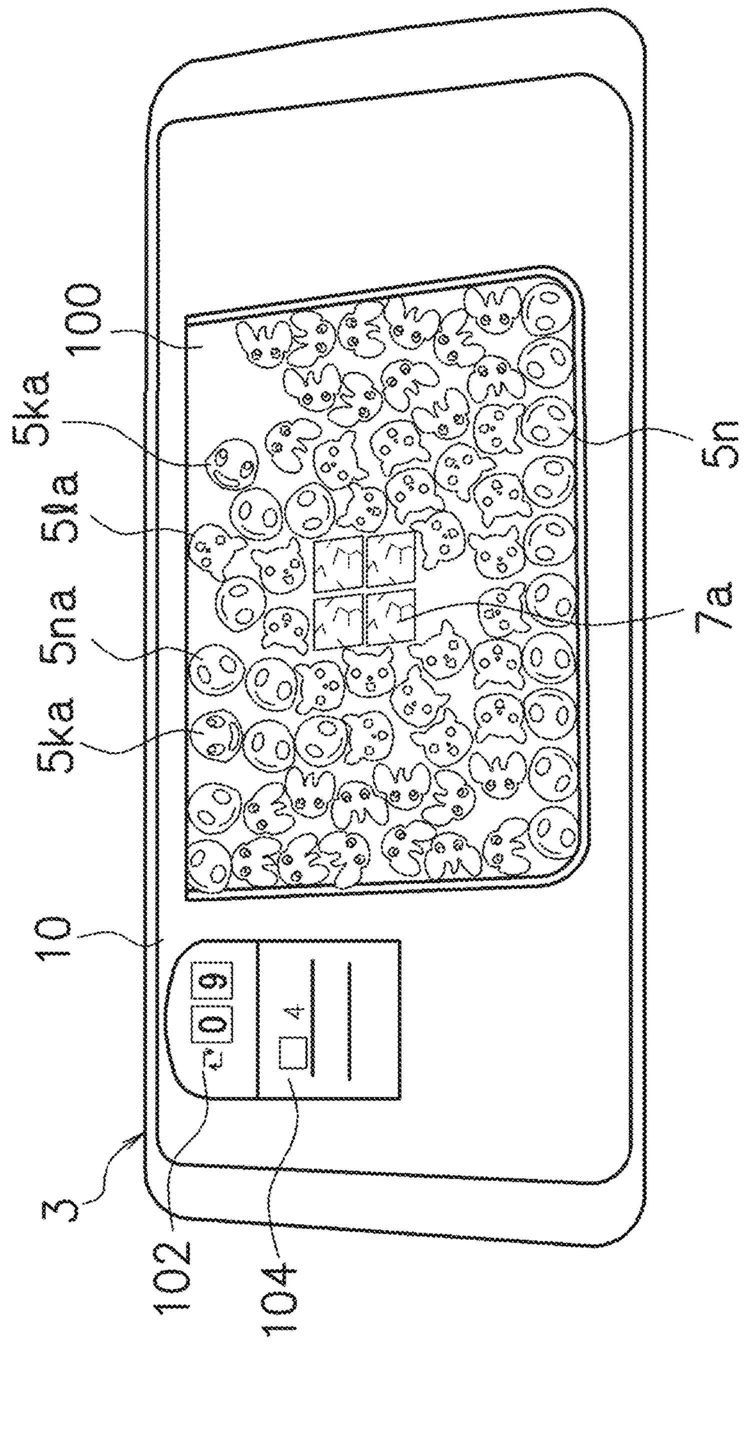
FIG. 6 is a schematic view of an action with respect to an object in the game system according to one or more aspects of the present disclosure.

FIGS. 5 and 6 show an overview of an example of an action with respect to an object in the game system according to one or more aspects of the present disclosure. Specifically, FIG. 5(*a*) shows an example of a display of the display portion 10 at the start of a game and FIGS. 5(*b*), 5(*c*), and 6 each show an example of a display of the display portion 10 during the game. The example shown in FIG. 5 represents an example where pluralities of puzzle elements of a plurality of types and objects are arranged in the game area 100. In addition, since the example shown in FIG. 5 is substantially the same as the example shown in FIG. 4 with the exception of the presence of objects in the game area 100, a detailed description will be omitted with the exception of differences.

First, as shown in FIG. 5(*a*), the display control portion 15 arranges a plurality of puzzle elements 5*k*, a plurality of puzzle elements 5*l*, a plurality of puzzle elements 5*m*, a plurality of puzzle elements 5*n*, and a plurality of objects 7 in the game area 100 and causes the display portion 10 to display the puzzle elements and the objects. In the example shown in FIG. 5(*a*), four objects 7 are arranged near a center of the game area 100 and the plurality of puzzle elements are arranged so as to surround a periphery of the objects 7. Next, the element selecting portion 30 selects one puzzle element from the plurality of puzzle elements in accordance with an operation of a player. In the example shown in FIG. 5(*b*), the element selecting portion 30 selects one puzzle element 5*k* in accordance with an operation of the player. In addition, the movement control portion 35 freely moves the one puzzle element 5*k* in the game area 100 in accordance with an operation of the player. However, the movement control portion 35 may prohibit a movement to a position where the object 7 is present or, in other words, a movement to a position that overlaps with the object 7.

In addition, when the contact determining portion 40 determines that a puzzle element to come into contact with the puzzle element 5*k* is of a same type as the puzzle element 5*k*, the coupling portion 45 couples the other puzzle element 5*k* of the same type to the puzzle element 5*k* being operated by the player. The coupling portion 45 repeats the coupling processing every time another puzzle element 5*k* of the same type comes into contact with the puzzle element 5*k* being operated by the player. Accordingly, as shown in FIG. 5(*b*), the coupled puzzle element 9 made up of a plurality of the puzzle elements 5*k* is generated. Subsequently, the movement control portion 35 moves the coupled puzzle element 9 in the game area 100 in accordance with an operation of the player. In the example shown in FIG. 5(*b*), the movement control portion 35 controls the coupled puzzle element 9 to form an approximately circular shape so as to surround the plurality of objects 7 arranged near the center of the game area 100 in accordance with an operation of the player. In FIG. 5(*b*), at least a part of the coupled puzzle element 9 is in contact with each of the four objects 7.

When the player no longer performs the operation with respect to the coupled puzzle element 9 in this state (in other words, when a touch operation with respect to the top puzzle element 5*k* of the coupled puzzle element 9 selected by the element selecting portion 30 in accordance with an operation of the player is no longer performed) or when a predetermined time has elapsed from a time point where the element selecting portion 30 had selected the top puzzle element 5*k*, the erasure control portion 55 erases the coupled puzzle element 9 as shown in FIG. 5(*c*). In addition, since the space 106 is formed in an area where the coupled puzzle element 9 had existed in the game area 100, puzzle elements (for example, the puzzle elements 5*n* and the puzzle elements 5*l*) that are present above the space 106 move (fall) toward the space 106.

In addition, the action generating portion 60 generates a predetermined action on the objects 7 having been in contact with the coupled puzzle element 9. For example, the action generating portion 60 generates an action of making cracks in the objects 7 as shown in FIG. 5(*c*) and the display control portion 15 causes cracked objects 7*a* to be displayed in the game area 100. For example, when a condition that the object 7 is erased when twice encountering an erasure of the coupled puzzle element 9 being in contact with the object 7 is set to the object 7, the action generating portion 60 generates an action of making cracks in the object 7 as described above when the object 7 encounters a first erasure of the coupled puzzle element 9, and erases the object 7 when the object 7 subsequently encounters a second erasure of the coupled puzzle element 9.

Next, the replenishing portion 65 replenishes one or more puzzle elements of one or more types of a number that corresponds to the number of puzzle elements 5*k* that make up the coupled puzzle element 9 erased by the erasure control portion 55 to the game area 100. The replenishing portion 65 selects a type of the puzzle elements to be replenished from the puzzle element 5*k*, the puzzle element 5*l*, the puzzle element 5*m*, and the puzzle element 5*n*. For example, as shown in FIG. 6, the replenishing portion 65 replenishes a plurality of puzzle elements (for example, a puzzle element 5*ka*, a puzzle element 5*na*, and a puzzle element 5*la*, where the puzzle element 5*ka* is of a same type as the puzzle element 5*k*, the puzzle element 5*na* is of a same type as the puzzle element 5*n*, and the puzzle element 5*la* is of a same type as the puzzle element 5*l* above the game area 100 or from a virtual game area provided above the game area 100 toward the game area 100. When the erasure control portion 55 erases the object 7, the replenishing portion 65 also adds the number of erased objects 7 to the number of puzzle elements making up the coupled puzzle element 9 erased by the erasure control portion 55 and replenishes one or more puzzle elements of one or more types of a number corresponding to the number after the addition. Furthermore, the reward generating portion 75 gives a reward such as a score to the player in accordance with the number of puzzle elements 5*k* making up the erased coupled puzzle element 9 or the like.

[Flow of Processing of Game System 1]

Figure 7:
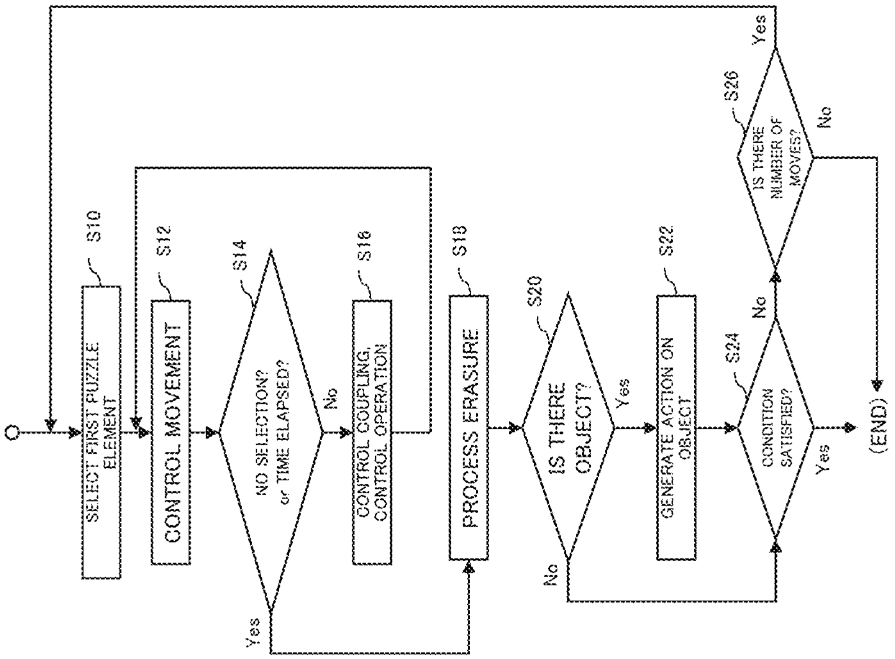
FIG. 7 is a flow chart showing a flow of processing in the game system according to one or more aspects of the present disclosure.

FIG. 7 shows an example of a flow of processing in the game system according to one or more aspects of the present disclosure.

First, the progress control portion 80 determines a completion condition of a game and the number of moves that a player can execute in the game. In addition, the display control portion 15 controls the display portion 10 to cause one or more puzzle elements of one or more types and objects to be displayed in the game area 100. In addition, the element selecting portion 30 selects one puzzle element (hereinafter, referred to as a "first puzzle element") in the game area 100 in accordance with a selection by the player (step 10: hereinafter, a step will be denoted as "S"). The movement control portion 35 accepts a movement instruction by the player with respect to the first puzzle element via the input portion 20 and controls movement of the first puzzle element in the game area 100 (S12).

Next, when the selection of the first puzzle element by the element selecting portion 30 is ongoing or when the selection of the first puzzle element is ongoing and a predetermined time has not elapsed from the selection of the first puzzle element (No in S14), the contact determining portion 40 determines a presence or absence of a contact between the first puzzle element and another puzzle element and an object. When the contact determining portion 40 determines that a puzzle element of a same type as the first puzzle element has come into contact with the first puzzle element, the coupling portion 45 generates a coupled puzzle element in which the puzzle element of the same type is coupled to the first puzzle element (S16). In addition, when the contact determining portion 40 determines that a puzzle element of a different type from the first puzzle element has come into contact with the first puzzle element and/or the coupled puzzle element, the operation control portion 50 causes the puzzle element of the different type to execute a predetermined operation (S16). In addition, the processing of S16 is continued until a determination of "Yes" is made in the processing of S14.

When the selection of the first puzzle element by the element selecting portion 30 is canceled or when a predetermined time has elapsed from the selection of the first puzzle element despite the selection of the first puzzle element being ongoing (Yes in S14), the erasure control portion 55 executes processing of erasing the first puzzle element and/or the coupled puzzle element from the game area 100 (S18). In this case, when an object is in contact with or in a vicinity of the first puzzle element and/or the coupled puzzle element to be erased (Yes in S20), the action generating portion 60 generates a predetermined action on the object (S22).

In addition, when the completion condition of the game is satisfied due to the erasure of the first puzzle element and/or the coupled puzzle element or the erasure of an object by the erasure control portion 55 (Yes in S24), the progress control portion 80 ends the game. In addition, even when an object is not in contact with or not in a vicinity of the first puzzle element and/or the coupled puzzle element to be erased (No in S20), when the completion condition of the game is satisfied (Yes in S24), the progress control portion 80 ends the game.

On the other hand, in both cases where the completion condition of the game is not satisfied (No in S24), the progress control portion 80 determines whether or not there are a remaining number of moves that allow the game to be continued (S26). When there are a remaining number of moves (Yes in S26), a puzzle element can be selected once again by the element selecting portion 30. When the progress control portion 80 determines that there are no remaining number of moves (No in S26), the progress control portion 80 ends the game.

Figure 8:
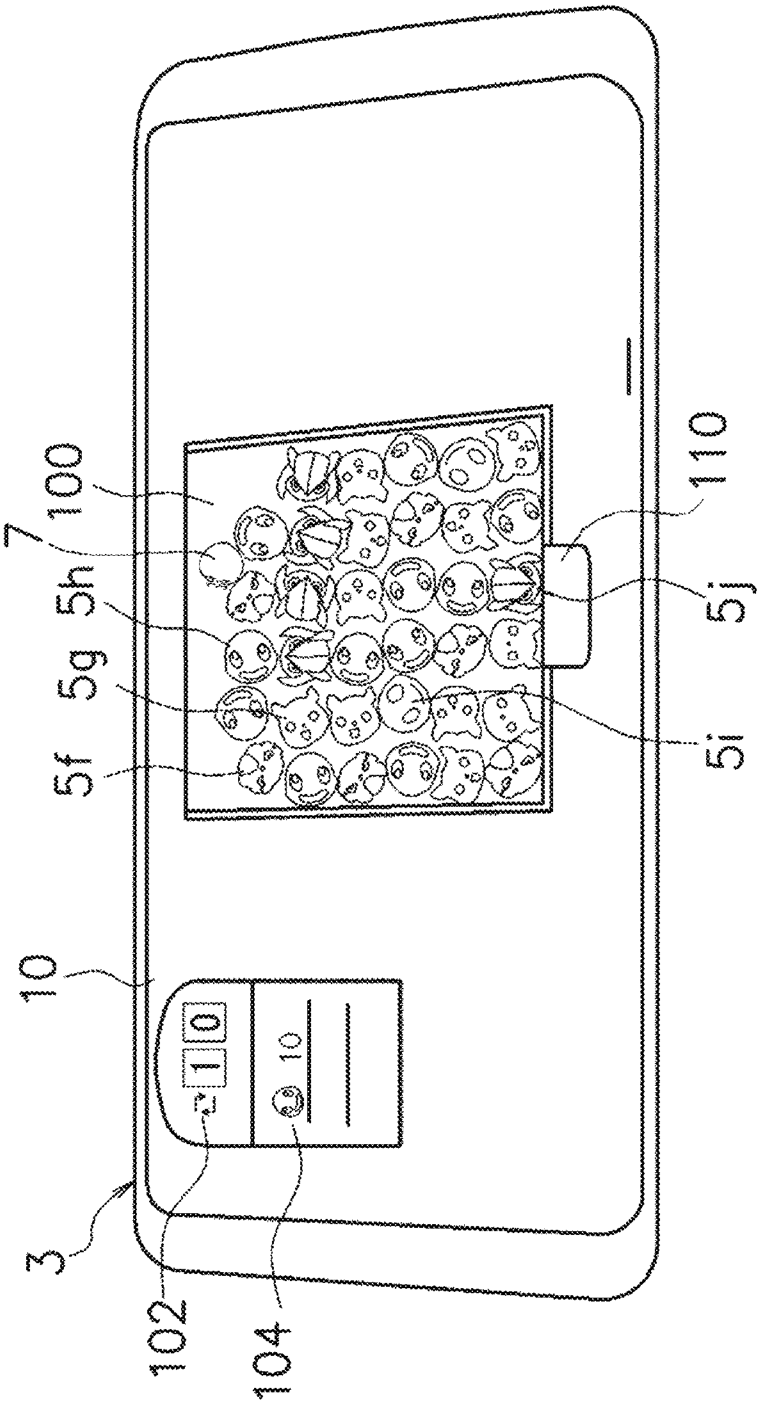
FIG. 8 is a schematic view of a game system according to one or more aspects of the present disclosure.

FIG. 8 shows an overview of an example of a modification of the game system according to one or more aspects of the present disclosure. Specifically, in the modification of the game system 1, a game is executed of which an object is to transport the object 7 to a predetermined arrival area 110 provided in the game area 100 or in a part of an outer edge of the game area 100 and to place the object 7 therein. Since functions and a configuration of the modification are substantially the same as the game system 1 with the exception of the fact that an object is not always erased due to an erasure of a coupled puzzle element, a detailed description will be omitted with the exception of differences.

First, as shown in FIG. 8, the display control portion 15 displays an arrival area 110 at a predetermined position on an outer edge of the game area 100, arranges a plurality of puzzle elements 5*f*, a plurality of puzzle elements 5*g*, a plurality of puzzle elements 5*h*, a plurality of puzzle elements 5*i*, a plurality of puzzle elements 5*j*, and the object 7, and causes the display portion 10 to display the puzzle elements and the object 7. In this case, the object 7 is arranged at a distant position from the arrival area 110. The puzzle elements to be arranged may be one or more puzzle elements of one or more types.

Next, the element selecting portion 30 selects one puzzle element from the plurality of puzzle elements in accordance with an operation of a player. In addition, the movement control portion 35 enables the one puzzle element to freely move in the game area 100 in accordance with an operation of the player. Next, when the contact determining portion 40 determines that a puzzle element to come into contact with the one puzzle element is of a same type as the one puzzle element, the coupling portion 45 couples the other puzzle element of the same type to the puzzle element being operated by the player and generates a coupled puzzle element made up of a plurality of puzzle elements. The movement control portion 35 moves the coupled puzzle element in the game area 100 in accordance with an operation of the player.

In addition, when the contact determining portion 40 determines that the puzzle element having come into contact with the coupled puzzle element is a puzzle element of a different type from the puzzle elements making up the coupled puzzle element and when the contact determining portion 40 determines that the object 7 has come into contact with the coupled puzzle element, the operation control portion 50 causes the puzzle element of the different type and the object 7 to execute a predetermined operation or, in other words, an operation of being flicked away by the coupled puzzle element. The flicked puzzle element and the object 7 move in the game area 100 and the virtual game area in a direction in which the puzzle element and the object 7 have been flicked away. When the player moves the coupled puzzle element in the game area 100 and moves the object 7 to the arrival area 110 while flicking away puzzle elements of different types and the object 7 using the coupled puzzle element, the progress control portion 80 determines that the game object has been achieved.

In this manner, in the modification of the game system 1, the puzzle element selected by the player or the coupled puzzle element generated as the player moves the puzzle element in the game area 100 can be used to mix other puzzle elements and the object 7 in the game area 100. In addition, due to the mixing, the object 7 moves in the game area 100 while being flicked away by the puzzle element selected by the player or the coupled puzzle element or by another puzzle element or another object 7 having been flicked away by the puzzle element selected by the player or the coupled puzzle element. The player can move the selected puzzle element or the coupled puzzle element so that the object 7 enters the arrival area 110.

While one arrival area 110 is shown in the example shown in FIG. 8, there may be a plurality of the arrival areas 110. In addition, there may be one or more objects 7. Furthermore, the shape of the game area 100 may be an irregular shape. For example, a protrusion can be provided near a center of a lower end of the game area 100, one or more objects 7 can be arranged on a left side of the protrusion, and the arrival area 110 can be provided at a lower end of the game area 100 on a right side of the protrusion. In addition, an object to be placed inside the arrival area 110 and an object to be erased by an erasure of a coupled puzzle element or a coupling area can be concurrently arranged in the game area 100. As an example, a protrusion can be provided near a center of a lower end of the game area 100, one or more objects 7 to be placed inside the arrival area 110 can be arranged on a left side of the protrusion, the arrival area 110 can be provided at a lower end of the game area 100 on a right side of the protrusion, one or more objects to be erased due to an erasure of a coupled puzzle element can be arranged above the arrival area 110, and one or more other puzzle elements can be arranged in other parts of the game area 100.

Furthermore, when the object 7 enters the arrival area 110, in both a case where an operation with respect to a puzzle element or a coupled puzzle element being operated by the player is no longer performed (in other words, when the player lifts a finger from the display portion 10) and a case where a predetermined time has elapsed while an operation is ongoing, the puzzle element or the coupled puzzle element may remain displayed in the game area 100. In addition, when the skill element generating portion 70 generates a skill element and at least any one of a condition in that an operation of a player with respect to a skill element selected by the element selecting portion 30 is no longer performed and a condition in that a predetermined time has elapsed from a time point at which the element selecting portion 30 had selected the skill element even though an operation of the player is ongoing is satisfied, the erasure control portion 55 erases the skill element from the game area 100 at a position in the game area 100 where the skill element is present at a time point where the condition has been satisfied. Furthermore, in accordance with the erasure of the skill element, the action generating portion 60 may erase a puzzle element present in a periphery of the skill element or present in a predetermined area in a direction in which the skill element is oriented. For example, by arranging a skill element at a predetermined position in accordance with an operation of the player, puzzle elements between the object 7 and the arrival area 110 can be erased.

[Game Program]

Each component included in the game system 1 according to one or more aspects of the present disclosure and the modification thereof shown in FIGS. 1 to 8 can be realized by having a processing device such as a central processing unit (CPU) and/or processing circuitry execute a program (in other words, a game program) or, in other words, due to processing by software. For example, the functionality of the elements disclosed herein may be implemented using circuitry or processing circuitry which includes general purpose processors, special purpose processors, CPU, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. Alternatively, each component can also be realized by writing the program into hardware such as an integrated circuit (IC) as an electronic part in advance. Software and hardware can also be used in combination.

The game program according to one or more aspects of the present disclosure and the modification can be built into an IC, a ROM, or the like in advance. In addition, the game program can be recorded as a file with an installable format or an executable format in a computer-readable recording medium such as a magnetic recording medium, an optical recording medium, or a semiconductor recording medium to be provided as a computer program. The recording medium storing the program may be a non-transitory recording medium such as a CD-ROM or a DVD. Furthermore, the game program can be stored in advance in a computer connected to a communication network such as the Internet and the game program can be made to be provided by download via the communication network.

The CPU or the like causes the game program according to one or more aspects of the present disclosure and the modification to function as the display portion 10, the display control portion 15, the input portion 20, the storage unit 25, the element selecting portion 30, the movement control portion 35, the contact determining portion 40, the coupling portion 45, the operation control portion 50, the erasure control portion 55, the action generating portion 60, the replenishing portion 65, the skill element generating portion 70, the reward generating portion 75, the progress control portion 80, the input screen 200, the input control portion 210, the puzzle element information storage portion 250, the skill element information storage portion 252, the object information storage portion 255, and the player information storage portion 260 described with reference to FIGS. 1 to 8.

Advantageous Effects

The game system 1 according to one or more aspects of the present disclosure can freely move a puzzle element in the game area 100 in accordance with an operation of a player. When a puzzle element of a same type as the puzzle element being moved by the player comes into contact with the puzzle element being moved by the player, a chain-shaped coupled puzzle element in which the puzzle element of the same type is coupled to the puzzle element can be generated, and a puzzle element of a different type from the puzzle element having come into contact with the puzzle element and/or the coupled puzzle element is flicked away by the puzzle element and/or the coupled puzzle element. Accordingly, in the game system 1, since the puzzle element selected by the player and the coupled puzzle element can be freely moved in the game area 100 while bulldozing its way through puzzle elements of a different type from the puzzle element (in other words, while mixing the puzzle elements in the game area 100), a game can be provided which has a high degree of freedom of movement of the puzzle elements and which enables randomness of an arrangement of each puzzle element to be enjoyed.

In addition, in the game system 1, since the degree of freedom of movement of a puzzle element is high as described above, a degree of freedom with respect to how a puzzle element selected by the player and/or a coupled puzzle element can be brought into contact with an object to be erased can also be secured. For example, an object may be surrounded by a coupled puzzle element or the coupled puzzle element can be brought into contact with a plurality of locations of the object. Accordingly, in the game system 1, psychological pressure of having to appropriately arrange puzzle elements can be reduced and a game can be advanced at a good pace.

While one or more exemplary embodiments of the present disclosure have been described above, the one or more exemplary embodiments described above are not intended to limit the disclosure as set forth in the scope of claims. In addition, it should be noted that not all combinations of features described in the one or more exemplary embodiments are essential as solutions to the problem addressed by the disclosure. Furthermore, technical elements of the one or more exemplary embodiments described above can be applied independently or applied by being divided into a plurality of portions such as program components and hardware components.

The invention claimed is:

1. A game system capable of executing a game using a puzzle element in a game area, the game system comprising:
- processing circuitry configured to
- select a first puzzle element from one or more puzzle elements of one or more types in accordance with an operation of a player;
- move the first puzzle element inside the game area in accordance with an operation of the player;
- in response to a puzzle element with a same appearance as the first puzzle element coming into contact with the first puzzle element, couple the first puzzle element and the puzzle element with the same appearance as the first puzzle element to each other and generate a coupled puzzle element having the first puzzle element and the puzzle element with the same appearance as the first puzzle element as components;
- in response to a second puzzle element of a type that differs from the first puzzle element coming into contact with the first puzzle element or the coupled puzzle element, cause the second puzzle element to execute a predetermined operation without coupling the first puzzle element and the second puzzle element to each other; and
- in response to at least any one of a condition in that an operation of the player with respect to the first puzzle element is no longer performed and a condition in that a predetermined time has elapsed from a time point at which the selection of the first puzzle element is satisfied, erase the coupled puzzle element from the game area.

2. The game system according to claim 1, wherein the circuitry is further configured to
- in response to a plurality of puzzle elements with the same appearance as the first puzzle element come into contact with the first puzzle element, couple the plurality of puzzle elements with the same appearance as the first puzzle element to the first puzzle element in a chain shape.

3. The game system according to claim 2, wherein the coupled puzzle element is configured to have the first puzzle element, the plurality of puzzle elements with the same appearance, and coupling areas that couple the puzzle elements to each other.

4. The game system according to claim 3, wherein the circuitry is further configured to
- replenish the one or more types of puzzle elements of a number corresponding to a total number of the first puzzle elements erased or a total number of the first puzzle elements constituting the coupled puzzle element and the puzzle elements with the same appearance to the game area.

5. The game system according to claim 1, wherein
- an object is arranged in the game area, and
- the processing circuitry is further configured to
- in response to erasing the first puzzle element or the coupled puzzle element, generate a predetermined action on the object in contact with or in a vicinity of the first puzzle element or the coupled puzzle element.

6. The game system according to claim 1, wherein the processing circuitry is further configured to
- generate a skill configured to generate a predetermined effect in a predetermined area of the game area in accordance with a predetermined condition, select the skill, and
- change an area where the predetermined effect is generated by changing an orientation of the skill in accordance with an operation of the player.

7. The game system according to claim 1, wherein each of the one or more puzzle elements of one or more types are present at any location in the game area in accordance with an operation of the player.

8. The game system according to claim 1, wherein
- the game area has a virtual game area which is connected to the game area and which is invisible to the player, and
- in response to a puzzle element not constituting the coupled puzzle element, the second puzzle element, and/or an object arranged in the game area coming into contact with the first puzzle element or the coupled puzzle element, move the puzzle element not constituting the coupled puzzle element, the second puzzle element, and/or the object to the virtual game area.

9. A game method of a game system capable of executing a game using a puzzle element in a game area, the game method comprising the steps of:
- selecting a first puzzle element from one or more puzzle elements of one or more types in accordance with an operation of a player;
- moving the first puzzle element inside the game area in accordance with an operation of the player;
- coupling, in response to a puzzle element with a same appearance as the first puzzle element coming into contact with the first puzzle element, the first puzzle element and the puzzle element with the same appearance as the first puzzle element to each other and generating a coupled puzzle element having the first puzzle element and the puzzle element with the same appearance as the first puzzle element as components;
- causing, in response to a second puzzle element of a type that differs from the first puzzle element coming into contact with the first puzzle element or the coupled puzzle element, the second puzzle element to execute a predetermined operation without coupling the first puzzle element and the second puzzle element to each other; and
- erasing, in response to at least any one of a condition in that an operation of the player with respect to the first puzzle element is no longer performed and a condition in that a predetermined time has elapsed from a time point at which the selection of the first puzzle element is satisfied, the coupled puzzle element from the game area.

10. A non-transitory computer-readable storage medium storing computer-readable instructions thereon which, when executed by a computer cause the computer to perform a method, the method comprising:

selecting a first puzzle element from one or more puzzle elements of one or more types in accordance with an operation of a player;

moving the first puzzle element inside the game area in accordance with an operation of the player;

coupling, in response to a puzzle element with a same appearance as the first puzzle element coming into contact with the first puzzle element, the first puzzle element and the puzzle element with the same appearance as the first puzzle element to each other and generating a coupled puzzle element having the first puzzle element and the puzzle element with the same appearance as the first puzzle element as components;

causing, in response to a second puzzle element of a type that differs from the first puzzle element coming into contact with the first puzzle element or the coupled puzzle element, the second puzzle element to execute a predetermined operation without coupling the first puzzle element and the second puzzle element to each other; and erasing, in response to at least any one of a condition in that an operation of the player with respect to the first puzzle element is no longer performed and a condition in that a predetermined time has elapsed from a time point at which the selection of the first puzzle element is satisfied, the coupled puzzle element from the game area.

11. A game server capable of providing a game using a puzzle element in a game area, the game server comprising:

processing circuitry configured to move a first puzzle element selected from one or more puzzle elements of one or more types in accordance with an operation of a player in the game area in accordance with an operation of the player;

in response to a puzzle element with a same appearance as the selected first puzzle element comes into contact with the first puzzle element, couple the first puzzle element and the puzzle element with the same appearance to each other and generate a coupled puzzle element having the first puzzle element and the puzzle element with the same appearance as components;

in response to a second puzzle element of a type that differs from the first puzzle element coming into contact with the first puzzle element or the coupled puzzle element, cause the second puzzle element to execute a predetermined operation without coupling the first puzzle element and the second puzzle element to each other; and in response to at least any one of a condition in that an operation of the player with respect to the selected first puzzle element is no longer performed and a condition in that a predetermined time has elapsed from a time point at which the first puzzle element had been selected is satisfied, erase the coupled puzzle element from the game area.

12. The game server according to claim 11, wherein the circuitry is further configured to in response to a plurality of puzzle elements with the same appearance as the first puzzle element come into contact with the first puzzle element, couple the plurality of puzzle elements with the same appearance as the first puzzle element to the first puzzle element in a chain shape.

13. The game server according to claim 12, wherein the coupled puzzle element is configured to have the first puzzle element, the plurality of puzzle elements with the same appearance, and coupling areas that couple the puzzle elements to each other.

14. The game server according to claim 13, wherein the circuitry is further configured to replenish the one or more types of puzzle elements of a number corresponding to a total number of the first puzzle elements erased or a total number of the first puzzle elements constituting the coupled puzzle element and the puzzle elements with the same appearance to the game area.

15. The game server according to claim 11, wherein an object is arranged in the game area, and the processing circuitry is further configured to in response to erasing the first puzzle element or the coupled puzzle element, generate a predetermined action on the object in contact with or in a vicinity of the first puzzle element or the coupled puzzle element.

16. The game server according to claim 11, wherein the processing circuitry is further configured to generate a skill configured to generate a predetermined effect in a predetermined area of the game area in accordance with a predetermined condition, select the skill, and change an area where the predetermined effect is generated by changing an orientation of the skill in accordance with an operation of the player.

17. The game server according to claim 11, wherein each of the one or more puzzle elements of one or more types are present at any location in the game area in accordance with an operation of the player.

18. The game server according to claim 11, wherein the game area has a virtual game area which is connected to the game area and which is invisible to the player, and in response to a puzzle element not constituting the coupled puzzle element, the second puzzle element, and/or an object arranged in the game area coming into contact with the first puzzle element or the coupled puzzle element, move the puzzle element not constituting the coupled puzzle element, the second puzzle element, and/or the object to the virtual game area.

* * * * *